US008022158B2

(12) United States Patent
Rathore et al.

(10) Patent No.: US 8,022,158 B2
(45) Date of Patent: Sep. 20, 2011

(54) WETTABLE HYDROGELS COMPRISING ACYCLIC POLYAMIDES

(75) Inventors: Osman Rathore, Cherry Hill, NJ (US); Shivkumar Mahadevan, Orange Park, FL (US); Frank Molock, Orange Park, FL (US); Azaam Alli, Jacksonville, FL (US); David Turner, Jacksonville, FL (US); Douglas G. Vanderlaan, Jacksonville, FL (US); Kevin P. McCabe, St. Augustine, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 0 days.

(21) Appl. No.: 12/710,980

(22) Filed: Feb. 23, 2010

(65) Prior Publication Data
US 2010/0151123 A1 Jun. 17, 2010

Related U.S. Application Data

(62) Division of application No. 11/057,363, filed on Feb. 14, 2005, now Pat. No. 7,786,185.

(60) Provisional application No. 60/550,723, filed on Mar. 5, 2004.

(51) Int. Cl.
C08F 20/52 (2006.01)
(52) U.S. Cl. .................................................. 526/303.1
(58) Field of Classification Search ............... 526/303.1
See application file for complete search history.

(56) References Cited

U.S. PATENT DOCUMENTS

| 3,408,429 | A | 10/1968 | Wichterle |
| 3,660,545 | A | 5/1972 | Wichterle |
| 3,808,178 | A | 4/1974 | Gaylord |
| 4,018,853 | A | 4/1977 | Le Boeuf et al. |
| 4,113,224 | A | 9/1978 | Clark et al. |
| 4,120,570 | A | 10/1978 | Gaylord |
| 4,136,250 | A | 1/1979 | Mueller |
| 4,153,641 | A | 5/1979 | Deichert |
| 4,190,277 | A | 2/1980 | England |
| 4,197,266 | A | 4/1980 | Clark et al. |
| 4,495,313 | A | 1/1985 | Larsen |
| 4,680,336 | A | 7/1987 | Larsen |
| 4,740,533 | A | 4/1988 | Su |
| 4,866,148 | A * | 9/1989 | Geyer et al. ............ 526/264 |
| 4,889,664 | A | 12/1989 | Kindt-Larsen |
| 5,006,622 | A | 4/1991 | Kunzler |
| 5,034,461 | A | 7/1991 | Lai |
| 5,039,459 | A | 8/1991 | Kindt-Larsen |
| 5,070,215 | A | 12/1991 | Bambury |
| 5,256,751 | A | 10/1993 | Vanderlaan |
| 5,311,223 | A | 5/1994 | Vanderlaan |
| 5,321,108 | A | 6/1994 | Kunzler |
| 5,387,662 | A | 2/1995 | Kunzler |
| 5,486,579 | A | 1/1996 | Lai |
| 5,496,871 | A | 3/1996 | Lai |
| 5,539,016 | A | 7/1996 | Kunzler |
| 5,944,853 | A | 8/1999 | Molock |
| 6,367,929 | B1 | 4/2002 | Maiden |
| 2003/0125498 | A1 | 7/2003 | McCabe |
| 2003/0162862 | A1 | 8/2003 | McCabe |
| 2004/0192872 | A1 | 9/2004 | Iwata |
| 2005/0179862 | A1 | 8/2005 | Steffen |

FOREIGN PATENT DOCUMENTS

| CN | 1074450 A | 7/1993 |
| EP | 80539 B1 | 5/1986 |
| JP | 2086643 A | 3/1990 |
| JP | 2002243190 A | 8/2002 |
| JP | 2003311762 A | 11/2003 |
| JP | 2004085655 A | 3/2004 |
| WO | WO 9631792 A1 | 10/1996 |
| WO | WO 03022321 A2 | 3/2003 |

OTHER PUBLICATIONS

E.S. Barabas; Encyclopedia of Polymer Science and Engineering, "N-Vinyl Amide Polymers"; 1989, 198-257, vol. 17, John Wiley and Sons, New York.
J.V. Crivello &K. DIETLIKER; XI Commercial Sources of Free Radical Photoinitiators, vol. III, Photoinitiators for Free Radical Cationic & Anionic Photopolymerisation, 1998, 275-298, 2nd Edition by edited by G. Bradley; John Wiley and Sons; New York.
Iso 9913-1: 1996(E), Optics and Optical Instruments—Contact Lenses—Part 1: Determination of Oxygen Permeability and Transmissibility by the FATT Method, Nov. 1, 1996, 1st Edition, International Organization for Standardization, Geneve, Switzerland.
PCT International Search Report, dated Sep. 7, 2005, for PCT Int'l. Appln. No. PCT/US2005/006640.
PCT International Search Report, dated Jan. 25, 2008, for PCT Int'l. Appln. No. PCT/US2007/013936.

* cited by examiner

Primary Examiner — Kuo-Liang Peng
(74) Attorney, Agent, or Firm — Karen A. Harding

(57) ABSTRACT

The present invention relates to biomedical devices, and particularly contact lenses comprising a polymer having entangled therein at least one acyclic polyamide.

24 Claims, No Drawings

WETTABLE HYDROGELS COMPRISING ACYCLIC POLYAMIDES

RELATED APPLICATIONS

This application is a divisional of U.S. patent application Ser. No. 11/057,363 filed Feb. 14, 2005, now U.S. Pat. No. 7,786,185, which claims priority of provisional application U.S. Ser. No. 60/550,723 filed on Mar. 5, 2004. The complete disclosures of the aforementioned related U.S. patent applications are hereby incorporated herein by reference for all purposes.

BACKGROUND OF THE INVENTION

Contact lenses have been used commercially to improve vision since at least the 1950s. The first contact lenses were made of hard materials and as such were somewhat uncomfortable to users. Modern soft contact lenses are made of softer materials, typically hydrogels. Recently soft contact lenses made from silicone hydrogels have been introduced. Silicone hydrogel are water-swollen polymer networks that have high oxygen permeability. These lenses provide a good level of comfort to many lens wearers, but there are some users who experience discomfort and excessive ocular deposits leading to reduced visual acuity when using these lenses. This discomfort and deposits has been attributed to the hydrophobic character of the surfaces of lenses and the interaction of those surfaces with the protein, lipids and mucin and the hydrophilic surface of the eye.

Others have tried to alleviate this problem by coating the surface of silicone hydrogel contact lenses with hydrophilic coatings, such as plasma coatings Cyclic polyamides, such as polyvinylpyrollidone have been incorporated into both conventional and silicone containing hydrogel formulations and contact lenses. Poly(meth)acrylamide and N-substituted poly(meth)acrylamides have been disclosed to be hydrophilic IPN agents which may be incorporated into conventional (non-silicone containing) hydrogels.

Modifying the surface of a polymeric article by adding polymerizable surfactants to a monomer mix used to form the article has also been disclosed. However, lasting in vivo improvements in wettability and reductions in surface deposits are not likely.

Polyvinylpyrrolidone (PVP) or poly-2-ethyl-2-oxazoline have been added to a hydrogel forming composition to form an interpenetrating network which shows a low degree of surface friction, a low dehydration rate and a high degree of biodeposit resistance. However, the hydrogel formulations disclosed are conventional hydrogels and there is no disclosure on how to incorporate hydrophobic components, such as siloxane monomers, without causing insolubility of the hydrogel-forming composition.

While it may be possible to incorporate high molecular weight polymers as internal wetting agents into silicone hydrogel lenses, such polymers can be difficult to solubilize in reaction mixtures which contain silicones.

Therefore it would be advantageous to find additional high molecular weight hydrophilic polymers which may be incorporated into a lens formulation to improve wettability of the lens without a surface treatment.

SUMMARY OF THE INVENTION

The present invention relates to a biomedical device comprising a polymer having entangled therein at least one acyclic polyamide comprising repeating units of

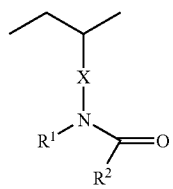

Formula I

Wherein X is a direct bond,

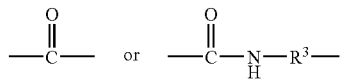

wherein $R^3$ is a C1 to C3 alkyl group;
$R^1$ is selected from H, straight or branched, substituted or unsubstituted C1 to C4 alkyl groups,
R2 is selected from H, straight or branched, substituted or unsubstituted C1 to C4 alkyl groups, amino groups having up to two carbons, amide groups having up to four carbon atoms and alkoxy groups having up to two carbons and wherein the number of carbon atoms in R1 and R2 taken together is 8 or less.

The present invention further relates to silicone hydrogels formed from a reaction mixture comprising or consisting essentially of at least one silicone containing component and at least one acyclic polyamide comprising repeating units of Formula I

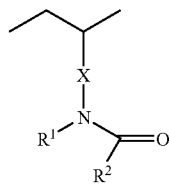

Wherein X is a direct bond,

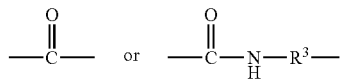

wherein $R^3$ is a C1 to C3 alkyl group;
$R^1$ is selected from H, straight or branched, substituted or unsubstituted C1 to C4 alkyl groups,
$R^2$ is selected from H, straight or branched, substituted or unsubstituted C1 to C4 alkyl groups, amino groups having up to two carbons, amide groups having up to four carbon atoms and alkoxy groups having up to two carbons and wherein the number of carbon atoms in $R^1$ and $R^2$ taken together is 8 or less, and preferably 6 or less.

DETAILED DESCRIPTION OF THE INVENTION

As used herein, a "biomedical device" is any article that is designed to be used while either in or on mammalian tissues or fluid, and preferably in or on human tissue or fluids. Examples of these devices include but are not limited to catheters, implants, stents, and ophthalmic devices such as intraocular lenses and contact lenses. The preferred biomedical devices are ophthalmic devices, particularly contact lenses, most particularly contact lenses made from silicone hydrogels.

As used herein, the terms "lens" and "ophthalmic device" refer to devices that reside in or on the eye. These devices can provide optical correction, wound care, drug delivery, diagnostic functionality, cosmetic enhancement or effect or a combination of these properties. The term lens includes but is not limited to soft contact lenses, hard contact lenses, intraocular lenses, overlay lenses, ocular inserts, and optical inserts.

As used herein, the phrase "without a surface treatment" means that the exterior surfaces of the devices of the present invention are not separately treated to improve the wettability of the device. Treatments which may be foregone because of the present invention include, plasma treatments, grafting, coating and the like. However, coatings which provide properties other than improved wettability, such as, but not limited to antimicrobial coatings and the application of color or other cosmetic enhancement may be applied to devices of the present invention.

As used herein the term "silicone containing compatibilizing component" means reaction components which contain at least one silicone and at least one hydroxyl group. Such components have been disclosed in U.S. Ser. Nos. 10/236,538 and 10/236,762.

The compositions of the present invention comprise, consist essentially and consist of at least one silicone containing component and at least one acyclic polyamide. Acyclic polyamides of the present invention comprise pendant acyclic amide groups and are capable of association with hydroxyl groups. When the acyclic polyamides are incorporated into the reactive mixture they have a weight average molecular weight of at least about 100,000 Daltons, preferably greater than about 150,000; more preferably between about 150,000 to about 2,000,000 Daltons, more preferably still between about 300,000 to about 1,800,000 Daltons. When the acyclic polyamides are incorporated into a solution in which a medical device formed from a hydrogel is stored, they have a weight average molecular weight of at least about 2,500 Daltons, preferably greater than about 25,000; more preferably between about 100,000 to about 2,000,000 Daltons, more preferably still between about 150,000 to about 1,800,000 Daltons.

Alternatively, the molecular weight of hydrophilic polymers of the invention can be also expressed by the K-value, based on kinematic viscosity measurements, as described in Encyclopedia of Polymer Science and Engineering, N-Vinyl Amide Polymers, Second edition, Vol 17, pgs. 198-257, John Wiley & Sons Inc. When expressed in this manner, the acyclic polyamides of the present invention are those having K-values of greater than about 46 and preferably between about 46 and about 150.

The acyclic polyamides of the present invention are incorporated into the hydrogel formulation of this invention without significant covalent bonding to the hydrogel. The absence of significant covalent bonding means that while a minor degree of covalent bonding may be present, it is incidental to the retention of the wetting agent in the hydrogel matrix. Whatever incidental covalent bonding may be present, it would not by itself be sufficient to retain the wetting agent in the hydrogel matrix. Instead, the vastly predominating effect keeping the wetting agent associated with the hydrogel is entrapment. The polymer is "entrapped", according to this specification, when it is physically retained within a hydrogel matrix. This is done via entanglement of the polymer chain of the acyclic polyamide within the hydrogel polymer matrix. However, van der Waals forces, dipole-dipole interactions, electrostatic attraction and hydrogen bonding can also contribute to this entrapment to a lesser extent.

The acyclic polyamides may be incorporated into the hydrogel by a variety of methods. For example, the acyclic polyamide may be added to the reaction mixture such that the hydrogel polymerizes "around" the acyclic polyamide, forming a semi-interpenetrating network. Alternatively, the acyclic polyamide may be included in the solution in which the lens is packaged. The acyclic polyamide permeates into the lens. The packaged lens may be heat treated to increase the amount of acyclic polyamide which permeates the lens. Suitable heat treatments, include, but are not limited to conventional heat sterilization cycles, which include temperatures of about 120° C. for times of about 20 minutes. If heat sterilization is not used, the packaged lens may be separately heat treated.

Examples of suitable acyclic polyamides include polymers and copolymers comprising repeating units of Formula I

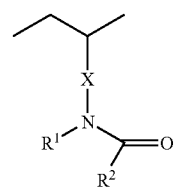

Wherein X is a direct bond,

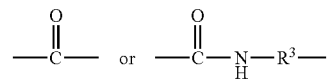

wherein $R^3$ is a C1 to C3 alkyl group;

$R^1$ is selected from H, straight or branched, substituted or unsubstituted C1 to C4 alkyl groups, $R^2$ is selected from H, straight or branched, substituted or unsubstituted C1 to C4 alkyl groups, amino groups having up to two carbons, amide groups having up to 4 carbon atoms and alkoxy groups having up to two carbons and wherein the number of carbon atoms in $R^1$ and $R^2$ taken together is 8, preferably 6 or less. As used herein substituted alkyl groups include alkyl groups substituted with an amine, amide, ether or carboxy group.

In one preferred embodiment $R^1$ and $R^2$ are independently selected from H, and substituted or unsubstituted C1 to C2 alkyl groups and preferably unsubstituted C1 to C2 alkyl groups.

In another preferred embodiment X is a direct bond, $R^1$ and $R^2$ are independently selected from H, substituted or unsubstituted C1 to C2 alkyl groups.

Preferably the acyclic polyamides of the present invention comprise a majority of the repeating unit of Formula I, and more preferably at least about 80 mole % of the repeating unit of Formula I.

Specific examples of repeating units of Formula I include repeating units derived from N-vinyl-N-methylacetamide, N-vinylacetamide, N-vinyl-N-methylpropionamide, N-vinyl-N-methyl-2-methylpropionamide, N-vinyl-2-methylpropionamide, N-vinyl-N,N'-dimethylurea, and the following acyclic amides:

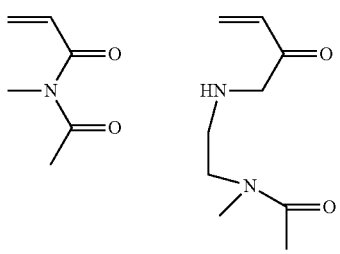

Additional repeating units may be formed from monomers selected from N-vinyl amides, acrylamides, hydroxyalkyl(meth)acrylates, alkyl(meth)acrylates or other hydrophilic monomers and siloxane substituted acrylates or methacrylates. Specific examples of monomers which may be used to form acyclic polyamides include as N-vinylpyrrolidone, N,N-dimethylacrylamide, 2-hydroxyethylmethacrylate, vinyl acetate, acrylonitrile, hydroxypropyl methacrylate, 2-hydroxyethyl acrylate, methyl methacrylate and butyl methacrylate, methacryloxypropyl tristrimethylsiloxysilane and the like and mixtures thereof. Preferred additional repeating units monomers include of N-vinylpyrrolidone, N,N-dimethylacrylamide, 2-hydroxyethylmethacrylate and mixtures thereof.

In one embodiment the acyclic polyamide is poly(N-vinyl-N-methylacetamide).

The acyclic polyamides may be used in amounts from about 1 to about 15 weight percent, more preferably about 3 to about 15 percent, most preferably about 5 to about 12 percent, all based upon the total of all reactive components.

In one embodiment, the hydrogels of the present invention further comprise one or more silicone-containing components and, optionally one or more hydrophilic components. The silicone-containing and hydrophilic components used to make the polymer of this invention can be any of the known components used in the prior art to make silicone hydrogels. These terms silicone-containing component and hydrophilic component are not mutually exclusive, in that, the silicone-containing component can be somewhat hydrophilic and the hydrophilic component can comprise some silicone, because the silicone-containing component can have hydrophilic groups and the hydrophilic components can have silicone groups.

Further, silicone-containing component(s) and hydrophilic component(s) can be reacted prior to polymerization to form a prepolymer which is later polymerized in the presence of a diluent to form the polymer of this invention. When prepolymers or macromers are used, it is preferred to polymerize at least one silicone-containing monomer and at least one hydrophilic monomer in the presence of the diluent, wherein the silicone-containing monomers and the hydrophilic monomers differ. The term "monomer" used herein refers to low molecular weight compounds (i.e. typically having number average molecular weights less than 700) that can be polymerized. Thus, it is understood that the terms "silicone-containing components" and "hydrophilic components" include monomers, macromonomers and prepolymers.

A silicone-containing component is one that contains at least one [—Si—O—Si] group, in a monomer, macromer or prepolymer. Preferably, the Si and attached O are present in the silicone-containing component in an amount greater than 20 weight percent, and more preferably greater than 30 weight percent of the total molecular weight of the silicone-containing component. Useful silicone-containing components preferably comprise polymerizable functional groups such as acrylate, methacrylate, acrylamide, methacrylamide, N-vinyl lactam, N-vinylamide, and styryl functional groups. Examples of silicone-containing components which are useful in this invention may be found in U.S. Pat. Nos. 3,808,178; 4,120,570; 4,136,250; 4,153,641; 4,740,533; 5,034,461 and 5,070,215, and EP080539. All of the patents cited herein are hereby incorporated in their entireties by reference. These references disclose many examples of olefinic silicone-containing components.

Further examples of suitable silicone-containing monomers are polysiloxanylalkyl(meth)acrylic monomers represented by the following formula:

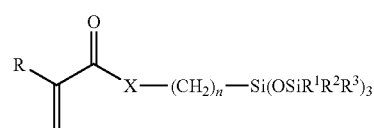

Formula II wherein: R denotes H or lower alkyl; X denotes O or $NR^4$; each $R^4$ independently denotes hydrogen or methyl, each $R^1$-$R^3$ independently denotes a lower alkyl radical or a phenyl radical, and n is 1 or 3 to 10.

Examples of these polysiloxanylalkyl(meth)acrylic monomers include methacryloxypropyl tris(trimethylsiloxy) silane, methacryloxymethylpentamethyldisiloxane, methacryloxypropylpentamethyldisilexane, methyldi(trimethylsiloxy)methacryloxypropyl silane, and methyldi(trimethylsiloxy)methacryloxymethyl silane. Methacryloxypropyl tris(trimethylsiloxy)silane is the most preferred.

One preferred class of silicone-containing components is a poly(organosiloxane) prepolymer represented by Formula III:

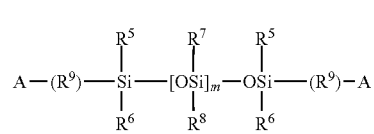

Formula III wherein each A independently denotes an activated unsaturated group, such as an ester or amide of an acrylic or a methacrylic acid or an alkyl or aryl group (providing that at least one A comprises an activated unsaturated group capable of undergoing radical polymerization); each of $R^5$, $R^6$, $R^7$ and $R^8$ are independently selected from the group consisting of a monovalent hydrocarbon radical or a halogen substituted monovalent hydrocarbon radical having 1 to 18 carbon atoms which may have ether linkages between carbon atoms;

$R^9$ denotes a divalent hydrocarbon radical having from 1 to 22 carbon atoms, and m is 0 or an integer greater than or equal to 1, and preferably 5 to 400, and more preferably 10 to 300. One specific example is α,ω-bismethacryloxypropyl poly-dimethylsiloxane. Another preferred example is mPDMS (monomethacryloxypropyl terminated mono-n-butyl terminated polydimethylsiloxane).

Another useful class of silicone containing components includes silicone-containing vinyl carbonate or vinyl carbamate monomers of the following formula:

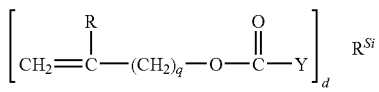

Formula IV wherein: Y denotes O, S. or NH; $R^{Si}$ denotes a silicone-containing organic radical; R denotes hydrogen or methyl; d is 1, 2, 3 or 4; and q is 0 or 1. Suitable silicone-containing organic radicals $R^{Si}$ include the following:

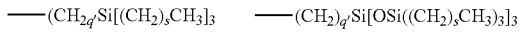

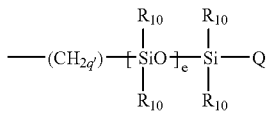

wherein:

Q denotes

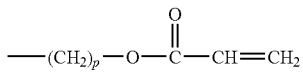

wherein p is 1 to 6; $R^{10}$ denotes an alkyl radical or a fluoroalkyl radical having 1 to 6 carbon atoms; e is 1 to 200; q' is 1, 2, 3 or 4; and s is 0, 1, 2, 3, 4 or 5.

The silicone-containing vinyl carbonate or vinyl carbamate monomers specifically include: 1,3-bis[4-(vinyloxycarbonyloxy)but-1-yl]tetramethyl-disiloxane; 3-(vinyloxycarbonylthio) propyl-[tris(trimethylsiloxy)silane]; 3-[tris(trimethylsiloxy)silyl]propyl allyl carbamate; 3-[tris(trimethylsiloxy)silyl]propyl vinyl carbamate; trimethylsilylethyl vinyl carbonate; trimethylsilylmethyl vinyl carbonate, and

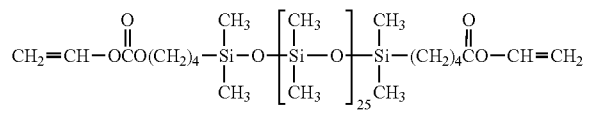

Another class of silicone-containing components includes polyurethane compounds of the following formulae:

(*D*A*D*G)$_a$*D*D*E$^1$;

E(*D*G*D*A)$_a$*D*G*D*E$^1$ or;

E(*D*A*D*G)$_a$*D*A*D*E$^1$  Formulae V-VII wherein:

D denotes an alkyl diradical, an alkyl cycloalkyl diradical, a cycloalkyl diradical, an aryl diradical or an alkylaryl diradical having 6 to 30 carbon atoms, G denotes an alkyl diradical, a cycloalkyl diradical, an alkyl cycloalkyl diradical, an aryl diradical or an alkylaryl diradical having 1 to 40 carbon atoms and which may contain ether, thio or amine linkages in the main chain;

* denotes a urethane or ureido linkage;

$a$ is at least 1;

A denotes a divalent polymeric radical of formula:

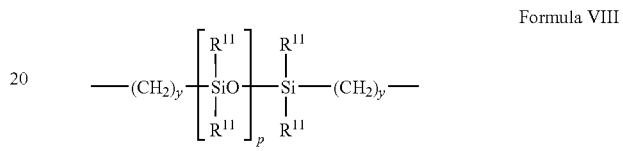

Formula VIII $R^{11}$ independently denotes an alkyl or fluoro-substituted alkyl group having 1 to 10 carbon atoms which may contain ether linkages between carbon atoms; y is at least 1; and p provides a moiety weight of 400 to 10,000; each of E and $E^1$ independently denotes a polymerizable unsaturated organic radical represented by formula:

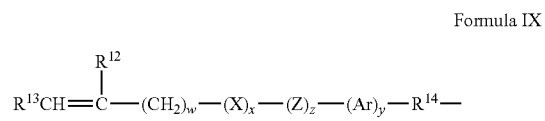

Formula IX wherein: $R^{12}$ is hydrogen or methyl; $R^{13}$ is hydrogen, an alkyl radical having 1 to 6 carbon atoms, or a —CO—Y—$R^{15}$ radical wherein Y is —O—, Y—S— or —NH—; $R^{14}$ is a divalent radical having 1 to 12 carbon atoms; X denotes —CO— or —OCO—; Z denotes —O— or —NH—; Ar denotes an aromatic radical having 6 to 30 carbon atoms; w is 0 to 6; x is 0 or 1; y is 0 or 1; and z is 0 or 1.

A preferred silicone-containing component is represented by the following formula:

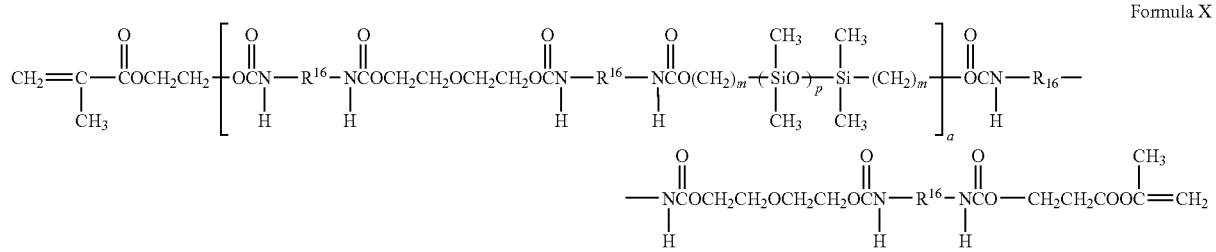

Formula X wherein $R^{16}$ is a diradical of a diisocyanate after removal of the isocyanate group, such as the diradical of isophorone diisocyanate. Another preferred silicone containing macromer is compound of formula X (in which x+y is a number in the range of 10 to 30) formed by the reaction of fluoroether, hydroxy-terminated polydimethylsiloxane, isophorone diisocyanate and isocyanatoethylmethacrylate.

Formula XI

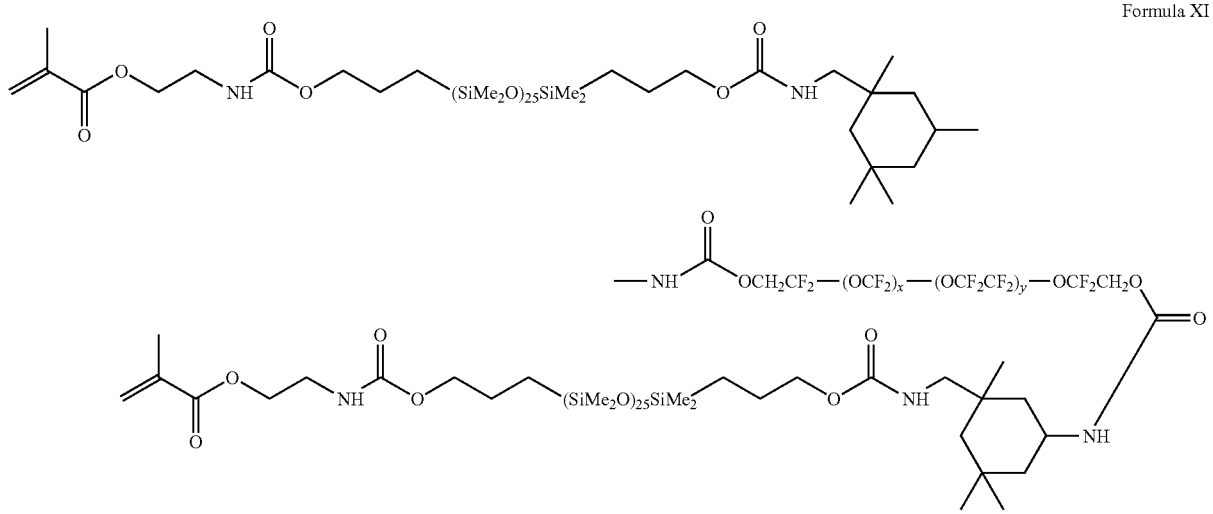

Other silicone-containing components suitable for use in this invention include those described is WO 96/31792 such as macromers containing polysiloxane, polyalkylene ether, diisocyanate, polyfluorinated hydrocarbon, polyfluorinated ether and polysaccharide groups. U.S. Pat. Nos. 5,321,108; 5,387,662 and 5,539,016 describe polysiloxanes with a polar fluorinated graft or side group having a hydrogen atom attached to a terminal difluoro-substituted carbon atom. Such polysiloxanes can also be used as the silicone monomer in this invention. The hydrophilic siloxanyl methacrylate monomers and polysiloxane-dimethacrylate macromers described in US 2004/0192872 can also be used in this invention.

Hydrophilic components include those which are capable of providing at least about 20% and preferably at least about 25% water content to the resulting lens when combined with the remaining reactive components. When present, suitable hydrophilic components may be present in amounts up to about 60 weight %, preferably between about 10 to about 60 weight %, more preferably between about 15 to about 50 weight % and more preferably still between about 20 to about 40 weight %, all based upon the weight of all reactive components. The hydrophilic monomers that may be used to make the polymers of this invention have at least one polymerizable double bond and at least one hydrophilic functional group. Examples of polymerizable double bonds include acrylic, methacrylic, acrylamido, methacrylamido, fumaric, maleic, styryl, isopropenylphenyl, O-vinylcarbonate, O-vinylcarbamate, allylic, O-vinylacetyl and N-vinyllactam and N-vinylamido double bonds. Such hydrophilic monomers may themselves be used as crosslinking agents. "Acrylic-type" or "acrylic-containing" monomers are those monomers containing the acrylic group (CR'H=CRCOX) wherein R is H or $CH_3$, R' is H, alkyl or carbonyl, and X is O or N, which are also known to polymerize readily, such as N,N-dimethylacrylamide (DMA), 2-hydroxyethyl acrylate, glycerol methacrylate, 2-hydroxyethyl methacrylamide, polyethyleneglycol monomethacrylate, methacrylic acid, acrylic acid and mixtures thereof.

Hydrophilic vinyl-containing monomers which may be incorporated into the hydrogels of the present invention include monomers such as N-vinyl lactams (e.g. N-vinyl pyrrolidone (NVP)), N-vinyl-N-methyl acetamide, N-vinyl-N-ethyl acetamide, N-vinyl-N-ethyl formamide, N-vinyl formamide, N-2-hydroxyethyl vinyl carbamate, N-carboxy-β-alanine N-vinyl ester, with NVP being preferred.

Other hydrophilic monomers that can be employed in the invention include polyoxyethylene polyols having one or more of the terminal hydroxyl groups replaced with a functional group containing a polymerizable double bond. Examples include polyethylene glycol with one or more of the terminal hydroxyl groups replaced with a functional group containing a polymerizable double bond. Examples include polyethylene glycol reacted with one or more molar equivalents of an end-capping group such as isocyanatoethyl methacrylate ("IEM"), methacrylic anhydride, methacryloyl chloride, vinylbenzoyl chloride, or the like, to produce a polyethylene polyol having one or more terminal polymerizable olefinic groups bonded to the polyethylene polyol through linking moieties such as carbamate or ester groups.

Still further examples are the hydrophilic vinyl carbonate or vinyl carbamate monomers disclosed in U.S. Pat. No. 5,070,215, and the hydrophilic oxazolone monomers disclosed in U.S. Pat. No. 4,190,277. Other suitable hydrophilic monomers will be apparent to one skilled in the art.

More preferred hydrophilic monomers which may be incorporated into the polymer of the present invention include hydrophilic monomers such as N,N-dimethyl acrylamide (DMA), 2-hydroxyethyl acrylate, glycerol methacrylate, 2-hydroxyethyl methacrylamide, N-vinylpyrrolidone (NVP), N-vinyl-N-methyl acetamide and polyethyleneglycol monomethacrylate.

Most preferred hydrophilic monomers include DMA, NVP and mixtures thereof.

When the acyclic polyamides of the present invention are incorporated into a silicone hydrogel formulation, it may be desirable to include at least one a hydroxyl containing component to help compatibilize the acyclic polyamide of the present invention and the silicone containing components. The hydroxyl containing component that may be used to make the polymers of this invention have at least one polymerizable double bond and at least one hydrophilic functional group. Examples of polymerizable double bonds include acrylic, methacrylic, acrylamido, methacrylamido, fumaric, maleic, styryl, isopropenylphenyl, O-vinylcarbonate, O-vinylcarbamate, allylic, O-vinylacetyl and N-vinyllactam and N-vinylamido double bonds. The hydroxyl containing component may also act as a crosslinking agent. In addition the hydroxyl containing component comprises a hydroxyl group. This hydroxyl group may be a primary, secondary or tertiary alcohol group, and may be located on an alkyl or aryl group. Examples of hydroxyl containing monomers that may be used include but are not limited to 2-hydroxyethyl methacrylate, 2-hydroxyethyl acrylate, 2-hydroxyethyl methacrylamide, 2-hydroxyethyl acrylamide, N-(2-hydroxyethyl)-O—vinyl carbamate, 2-hydroxyethyl vinyl carbonate, 2-hydroxypropyl methacrylate, hydroxyhexyl methacrylate, hydroxyoctyl methacrylate and other hydroxyl functional monomers as disclosed in U.S. Pat. Nos. 5,006,622; 5,070,215; 5,256,751 and 5,311,223. Preferred hydrophilic components include 2-hydroxyethyl methacrylate. The hydroxyl containing component may also include silicone or siloxane functionalities, such as the hydroxyl-functionalized silicone containing monomers disclosed in WO03/022321, the disclosure of which is incorporated herein by reference.

Alternatively the acyclic polyamides may be included in hydrophilic hydrogels which do not comprise silicone. Generally these hydrogels are made from the hydrophilic monomers listed above. Commercially available hydrogel formulations include, but are not limited to etafilcon, polymacon, vifilcon, genfilcon A and lenefilcon A.

Generally the reactive components are mixed in a diluent to form a reaction mixture. Suitable diluents are known in the art. For silicone hydrogels suitable diluents are disclosed in WO 03/022321, the disclosure of which is incorporated herein by reference.

Classes of suitable diluents for silicone hydrogel reaction mixtures include alcohols having 2 to 20 carbons, amides having 10 to 20 carbon atoms derived from primary amines and carboxylic acids having 8 to 20 carbon atoms. In some embodiments primary and tertiary alcohols are preferred. Preferred classes include alcohols having 5 to 20 carbons and carboxylic acids having 10 to 20 carbon atoms.

Specific diluents which may be used include 1-ethoxy-2-propanol, diisopropylaminoethanol, isopropanol, 3,7-dimethyl-3-octanol, 1-decanol, 1-dodecanol, 1-octanol, 1-pentanol, 2-pentanol, 1-hexanol, 2-hexanol, 2-octanol, 3-methyl-3-pentanol, tert-amyl alcohol, tert-butanol, 2-butanol, 1-butanol, 2-methyl-2-pentanol, 2-propanol, 1-propanol, ethanol, 2-ethyl-1-butanol, (3-acetoxy-2-hydroxypropyloxy) propylbis(trimethylsiloxy)methylsilane, 1-tert-butoxy-2-propanol, 3,3-dimethyl-2-butanol, tert-butoxyethanol, 2-octyl-1-dodecanol, decanoic acid, octanoic acid, dodecanoic acid, 2-(diisopropylamino)ethanol mixtures thereof and the like.

Preferred diluents include 3,7-dimethyl-3-octanol, 1-dodecanol, 1-decanol, 1-octanol, 1-pentanol, 1-hexanol, 2-hexanol, 2-octanol, 3-methyl-3-pentanol, 2-pentanol, t-amyl alcohol, tert-butanol, 2-butanol, 1-butanol, 2-methyl-2-pentanol, 2-ethyl-1-butanol, ethanol, 3,3-dimethyl-2-butanol, 2-octyl-1-dodecanol, decanoic acid, octanoic acid, dodecanoic acid, mixtures thereof and the like.

More preferred diluents include 3,7-dimethyl-3-octanol, 1-dodecanol, 1-decanol, 1-octanol, 1-pentanol, 1-hexanol, 2-hexanol, 2-octanol, 1-dodecanol, 3-methyl-3-pentanol, 1-pentanol, 2-pentanol, t-amyl alcohol, tert-butanol, 2-butanol, 1-butanol, 2-methyl-2-pentanol, 2-ethyl-1-butanol, 3,3-dimethyl-2-butanol, 2-octyl-1-dodecanol, mixtures thereof and the like.

Suitable diluents for non-silicone containing reaction mixtures include glycerin, ethylene glycol, ethanol, methanol, ethyl acetate, methylene chloride, polyethylene glycol, polypropylene glycol, low molecular weight PVP, such as disclosed in U.S. Pat. No. 4,018,853, U.S. Pat. No. 4,680,336 and U.S. Pat. No. 5,039,459, including, but not limited to boric acid esters of dihydric alcohols, combinations thereof and the like.

Mixtures of diluents may be used. The diluents may be used in amounts up to about 55% by weight of the total of all components in the reaction mixture. More preferably the diluent is used in amounts less than about 45% and more preferably in amounts between about 15 and about 40% by weight of the total of all components in the reaction mixture.

It is generally necessary to add one or more cross-linking agents, also referred to as cross-linking monomers, to the reaction mixture, such as ethylene glycol dimethacrylate ("EGDMA"), trimethylolpropane trimethacrylate ("TMPTMA"), glycerol trimethacrylate, polyethylene glycol dimethacrylate (wherein the polyethylene glycol preferably has a molecular weight up to, e.g., about 5000), and other polyacrylate and polymethacrylate esters, such as the end-capped polyoxyethylene polyols described above containing two or more terminal methacrylate moieties. The cross-linking agents are used in the usual amounts, e.g., from about 0.000415 to about 0.0156 mole per 100 grams of reactive components in the reaction mixture. (The reactive components are everything in the reaction mixture except the diluent and any additional processing aids which do not become part of the structure of the polymer.) Alternatively, if the hydrophilic monomers and/or the silicone-containing monomers act as the cross-linking agent, the addition of a crosslinking agent to the reaction mixture is optional. Examples of hydrophilic monomers which can act as the crosslinking agent and when present do not require the addition of an additional crosslinking agent to the reaction mixture include polyoxyethylene polyols described above containing two or more terminal methacrylate moieties.

An example of a silicone-containing monomer which can act as a crosslinking agent and, when present, does not require the addition of a crosslinking monomer to the reaction mixture includes $\alpha,\omega$-bismethacryloxypropyl polydimethylsiloxane.

The reaction mixture may contain additional components such as, but not limited to, UV absorbers, medicinal agents, antimicrobial compounds, reactive tints, pigments, copolymerizable and nonpolymerizable dyes, release agents and combinations thereof.

A polymerization catalyst is preferably included in the reaction mixture. The polymerization initiators includes compounds such as lauryl peroxide, benzoyl peroxide, isopropyl percarbonate, azobisisobutyronitrile, and the like, that generate free radicals at moderately elevated temperatures, and photoinitiator systems such as aromatic alpha-hydroxy ketones, alkoxyoxybenzoins, acetophenones, acylphosphine oxides, bisacylphosphine oxides, and a tertiary amine plus a diketone, mixtures thereof and the like. Illustrative examples of photoinitiators are 1-hydroxycyclohexyl phenyl ketone, 2-hydroxy-2-methyl-1-phenyl-propan-1-one, bis(2,6-dimethoxybenzoyl)-2,4-4-trimethylpentyl phosphine oxide (DMBAPO), bis(2,4,6-trimethylbenzoyl)-phenyl phosphineoxide (Irgacure 819), 2,4,6-trimethylbenzyldiphenyl phosphine oxide and 2,4,6-trimethylbenzoyl diphenylphosphine oxide, benzoin methyl ester and a combination of camphorquinone and ethyl 4-(N,N-dimethylamino)benzoate. Commercially available visible light initiator systems include Irgacure 819, Irgacure 1700, Irgacure 1800, Irgacure 819, Irgacure 1850 (all from Ciba Specialty Chemicals) and Lucirin TPO initiator (available from BASF). Commercially available UV photoinitiators include Darocur 1173 and Darocur 2959 (Ciba Specialty Chemicals). These and other photoinitiators which may be used are disclosed in Volume III, Photoinitiators for Free Radical Cationic & Anionic Photopolymerization, $2^{nd}$ Edition by J. V. Crivello & K. Dietliker; edited by G. Bradley; John Wiley and Sons; New York; 1998, which is incorporated herein by reference. The initiator is used in the reaction mixture in effective amounts to initiate photopolymerization of the reaction mixture, e.g., from about 0.1 to about 2 parts by weight per 100 parts of reactive monomer. Polymerization of the reaction mixture can be initiated using the appropriate choice of heat or visible or ultraviolet light or other means depending on the polymerization initiator used. Alternatively, initiation can be conducted without a photoinitiator using, for example, e-beam. However, when a photoinitiator is used, the preferred initiators are bisacylphosphine oxides, such as bis(2,4,6-trimethylbenzoyl)-phenyl phosphine oxide (Irgacure 819®) or a combination of 1-hydroxycyclohexyl phenyl ketone and bis (2,6-dimethoxybenzoyl)-2,4-4-trimethylpentyl phosphine oxide (DMBAPO), and the preferred method of polymerization initiation is visible light. The most preferred is bis(2,4, 6-trimethylbenzoyl)-phenyl phosphine oxide (Irgacure 819®).

The preferred range of silicone-containing monomer present in the reaction mixture is from about 5 to 95 weight percent, more preferably about 30 to 85 weight percent, and most preferably about 45 to 75 weight percent of the reactive components in the reaction mixture. The preferred range of hydrophilic monomer present in the above invention is from about 5 to 80 weight percent, more preferably about 10 to 60 weight percent, and most preferably about 20 to 50 weight percent of the reactive components in the reaction mixture. The preferred range of diluent present in the above invention is from about 2 to 70 weight percent, more preferably about 5 to 50 weight percent, and most preferably about 15 to 40 weight percent of the total reaction mixture (including reactive and nonreactive components).

Preferred combinations of reactive components and diluents are those having from about 25 to about 55 weight % silicone-containing monomer, about 20 to about 40 weight % hydrophilic monomer, from about 5 to about 20 weight % of an hydroxyl containing component, from about 0.2 to about 3 weight % of a crosslinking monomer, from about 0 to about 3 weight % of a UV absorbing monomer, from about 2 to about 10 weight % of an acyclic polyamide (all based upon the weight % of all reactive components) and about 20 to about 50 weight % (weight % of all components, both reactive and non-reactive) of one or more of the claimed diluents.

The reaction mixtures of the present invention can be formed by any of the methods known to those skilled in the art, such as shaking or stirring, and used to form polymeric articles or devices by known methods.

For example, the biomedical devices of the invention may be prepared by mixing reactive components and the diluent(s) with a polymerization initator and curing by appropriate conditions to form a product that can be subsequently formed into the appropriate shape by lathing, cutting and the like. Alternatively, the reaction mixture may be placed in a mold and subsequently cured into the appropriate article.

Various processes are known for processing the reaction mixture in the production of contact lenses, including spincasting and static casting. Spincasting methods are disclosed in U.S. Pat. Nos. 3,408,429 and 3,660,545, and static casting methods are disclosed in U.S. Pat. Nos. 4,113,224 and 4,197, 266. The preferred method for producing contact lenses comprising the polymer of this invention is by the molding of the silicone hydrogels, which is economical, and enables precise control over the final shape of the hydrated lens. For this method, the reaction mixture is placed in a mold having the shape of the final desired silicone hydrogel, i.e., water-swollen polymer, and the reaction mixture is subjected to conditions whereby the monomers polymerize, to thereby produce a polymer/diluent mixture in the shape of the final desired product. Then, this polymer/diluent mixture is treated with a solvent to remove the diluent and ultimately replace it with water, producing a silicone hydrogel having a final size and shape which are quite similar to the size and shape of the original molded polymer/diluent article. This method can be used to form contact lenses and is further described in U.S. Pat. Nos. 4,495,313; 4,680,336; 4,889,664; and 5,039,459, incorporated herein by reference.

In another embodiment, the lens is formed without acyclic polymer and after formation, is placed in a solution comprising acyclic polyamide. In this embodiment the lens is formed from hydrophilic polymers in amounts between about 40 and 100 weight % of the reactive components. Suitable solutions include packing solution, storing solution and cleaning solutions. Preferably the lens is placed in a packing solution comprising said acyclic polyamide. The acyclic polyamide is present in the solution in amounts between about 0.001 and about 10%, preferably between about 0.005 and about 2% and more preferably between about 0.01 and about 0.5 weight %, based upon all components in the solution.

The packing solutions of the invention may be any water-based solution that is used for the storage of contact lenses. Typical solutions include, without limitation, saline solutions, other buffered solutions, and deionized water. The preferred aqueous solution is saline solution containing salts including, without limitation, sodium chloride, sodium borate, sodium phosphate, sodium hydrogenphosphate, sodium dihydrogenphosphate, or the corresponding potassium salts of the same. These ingredients are generally combined to form buffered solutions that include an acid and its conjugate base, so that addition of acids and bases cause only a relatively small change in pH. The buffered solutions may additionally include 2-(N-morpholino)ethanesulfonic acid (MES), sodium hydroxide, 2,2-bis(hydroxymethyl)-2,2',2"-nitrilotriethanol, n-tris(hydroxymethyl)methyl-2-aminoethanesulfonic acid, citric acid, sodium citrate, sodium carbonate, sodium bicarbonate, acetic acid, sodium acetate, ethylenediamine tetraacetic acid and the like and combinations thereof. Preferably, the solution is a borate buffered or phosphate buffered saline solution. The solutions may also include known additional components such as viscosity adjusting agents, antimicrobial agents, polyelectrolytes, stabilizers, chelants, antioxidants, combinations thereof and the like.

The device is contacted with the acyclic polyamide under conditions sufficient to incorporate a lubricious effective amount of said acyclic polyamide. As used herein, a lubricious effective amount, is an amount necessary to impart a level of lubricity which may be felt manually (such as by rubbing the device between one's fingers) or when the device is used. It has been found that in one embodiment, where the device is a soft contact lens, when amounts of acyclic polyamide as little as 10 ppm provide improved lens "feel". Amounts of acyclic polyamide greater than about 50 pm, and more preferably amounts greater than about 100 ppm, (measured via extraction in 2 ml of a 1:1 DMF:deionized water solution, for 72 hours) add a more pronounced improvement in feel. The packaged lens may be heat treated to increase the amount of acyclic polyamide which permeates and becomes entangled in the lens. Suitable heat treatments, include, but are not limited to conventional heat sterilization cycles, which include temperatures of about 120° C. for times of about 20 minutes and may be conducted in an autoclave. If heat sterilization is not used, the packaged lens may be separately heat treated. Suitable temperatures for separate heat treatment include at least about 40° C., and preferably between about 50° C. and the boiling point of the solution. Suitable heat treatment times include at least about 10 minutes. It will be appreciated that higher temperatures will require less treatment time.

The biomedical devices, and particularly ophthalmic lenses of the present invention have a balance of properties which makes them particularly useful. Such properties include clarity, water content, oxygen permeability and contact angle. Thus, in one embodiment, the biomedical devices are contact lenses having a water content of greater than about 17%, preferably greater than about 20% and more preferably greater than about 25%.

As used herein clarity means substantially free from visible haze. Preferably clear lenses have a haze value of less than about 150%, more preferably less than about 100%.

Suitable oxygen permeabilities for silicone containing lenses are preferably greater than about 40 barrer and more preferably greater than about 60 barrer.

Also, the biomedical devices, and particularly ophthalmic devices and contact lenses have contact angles (advancing) which are less than about 80°, preferably less than about 70° and more preferably less than about 65°. In some preferred embodiments the articles of the present invention have combinations of the above described oxygen permeability, water content and contact angle. All combinations of the above ranges are deemed to be within the present invention.

The non-limiting examples below further describe this invention.

The dynamic contact angle or DCA, was measured at 23° C., with borate buffered saline, using a Wilhelmy balance. The wetting force between the lens surface and borate buffered saline is measured using a Wilhelmy microbalance while the sample strip cut from the center portion of the lens is being immersed into the saline at a rate of 100 microns/sec. The following equation is used $$F = 2\gamma p \cos\theta \text{ or } \theta = \cos^{-1}(F/2\gamma p)$$

where F is the wetting force, $\gamma$ is the surface tension of the probe liquid, p is the perimeter of the sample at the meniscus and $\theta$ is the contact angle. Typically, two contact angles are obtained from a dynamic wetting experiment—advancing contact angle and receding contact angle. Advancing contact angle is obtained from the portion of the wetting experiment where the sample is being immersed into the probe liquid, and these are the values reported herein. At least four lenses of each composition are measured and the average is reported.

The water content was measured as follows: lenses to be tested were allowed to sit in packing solution for 24 hours. Each of three test lens were removed from packing solution using a sponge tipped swab and placed on blotting wipes which have been dampened with packing solution. Both sides of the lens were contacted with the wipe. Using tweezers, the test lens were placed in a weighing pan and weighed. The two more sets of samples were prepared and weighed as above. The pan was weighed three times and the average is the wet weight.

The dry weight was measured by placing the sample pans in a vacuum oven which has been preheated to 60° C. for 30 minutes. Vacuum was applied until at least 0.4 inches Hg is attained. The vacuum valve and pump were turned off and the lenses were dried for four hours. The purge valve was opened and the oven was allowed reach atmospheric pressure. The pans were removed and weighed. The water content was calculated as follows:

Wet weight = combined wet weight of pan and lenses − weight of weighing pan

Dry weight = combined dry weight of pan and lens − weight of weighing pan $$\% \text{ water content} = \frac{(\text{wet weight} - \text{dry weight})}{\text{wet weight}} \times 100$$

The average and standard deviation of the water content are calculated for the samples are reported.

Modulus was measured by using the crosshead of a constant rate of movement type tensile testing machine equipped with a load cell that is lowered to the initial gauge height. A suitable testing machine includes an Instron model 1122. A dog-bone shaped sample having a 0.522 inch length, 0.276 inch "ear" width and 0.213 inch "neck" width was loaded into the grips and elongated at a constant rate of strain of 2 in/min. until it broke. The initial gauge length of the sample (Lo) and sample length at break (Lf) were measured. Twelve specimens of each composition were measured and the average is reported. Tensile modulus was measured at the initial linear portion of the stress/strain curve.

The dynamic coefficient of friction of the contact lens was measured using a Tribometer, Model UMT-2 unit, with a pin-on-disk sample mount. The contact lens sample was removed from its packing solution and placed on the tip of the "pin" with the center of the lens on the pin tip and pressed against a highly polished stainless steel disk moving at a constant speed of either 10 or 15 cm/sec. Loads of 3, 5, 10 and 20 g were used. The duration at each load was 25 seconds and all measurements were taken at ambient temperature. The resistant frictional force was measured and was used to calculate the coefficient of friction using the following formula: $\mu = (F-f')/N$, where $\mu$=coefficient of friction
F=measured frictional force, f+f'
f=actual frictional force
f'=experimental artifacts due lens deformation, such as dehydration and interfacial surface tension forces, elasticity, etc.
N=normal load Seven lenses were tested for each lens type. The coefficient of friction were averaged and reported.

Haze is measured by placing a hydrated test lens in borate buffered saline in a clear 20×40×10 mm glass cell at ambient temperature above a flat black background, illuminating from below with a fiber optic lamp (Titan Tool Supply Co. fiber optic light with 0.5" diameter light guide set at a power setting of 4-5.4) at an angle 66° normal to the lens cell, and capturing an image of the lens from above, normal to the lens cell with a video camera (DVC 1300C:19130 RGB camera with Navitar TV Zoom 7000 zoom lens) placed 14 mm above the lens platform. The background scatter is subtracted from the scatter of the lens by subtracting an image of a blank cell using EPIX XCAP V 1.0 software. The subtracted scattered light image is quantitatively analyzed, by integrating over the central 10 mm of the lens, and then comparing to a −1.00 diopter CSI Thin Lens®, which is arbitrarily set at a haze value of 100, with no lens set as a haze value of 0. Five lenses are analyzed and the results are averaged to generate a haze value as a percentage of the standard CSI lens.

Oxygen permeability (Dk) was determined by the polarographic method generally described in ISO 9913-1: 1996(E), but with the following variations. The measurement is conducted at an environment containing 2.1% oxygen. This environment is created by equipping the test chamber with nitrogen and air inputs set at the appropriate ratio, for example 1800 ml/min of nitrogen and 200 ml/min of air. The t/Dk is calculated using the adjusted $p_{O2}$. Borate buffered saline was used. The dark current was measured by using a pure humidified nitrogen environment instead of applying MMA lenses. The lenses were not blotted before measuring. Four lenses were stacked instead of using lenses of varied thickness. A curved sensor was used in place of a flat sensor. The resulting Dk value is reported in barrers.

The following abbreviations will be used throughout the Examples and have the following meanings.
SiGMA 2-propenoic acid, 2-methyl-, 2-hydroxy-3-[3-[1,3,3,3-tetramethyl-1-[(trimethylsilyl)oxy]disiloxanyl]propoxy]propyl ester
DMA N,N-dimethylacrylamide
HEMA 2-hydroxyethyl methacrylate
mPDMS 800-1000 MW ($M_n$) monomethacryloxypropyl terminated mono-n-butyl terminated polydimethylsiloxane
Norbloc 2-(2'-hydroxy-5-methacrylyloxyethylphenyl)-2H-benzotriazole
CGI 1850 1:1 (wgt) blend of 1-hydroxycyclohexyl phenyl ketone and bis(2,6-dimethoxybenzoyl)-2,4-4-trimethylpentyl phosphine oxide
CGI 819 bis(2,4,6-trimethylbenzoyl)-phenylphosphineoxide
PVP poly(N-vinyl pyrrolidone) (K value 90)
Blue HEMA the reaction product of Reactive Blue 4 and HEMA, as described in Example 4 of U.S. Pat. No. 5,944,853
IPA isopropyl alcohol
D3O 3,7-dimethyl-3-octanol
DI water deionized water
TEGDMA tetraethyleneglycol dimethacrylate
PVMA poly(N-vinyl-N-methylacetamide) (prepared in Preparation 2)
mPDMS-OH mono-(3-methacryloxy-2-hydroxypropyloxy) propyl terminated, mono-butyl terminated polydimethylsiloxane (MW 1100) Prepared as in Preparation 1
acPDMS bis-3-acryloxy-2-hydroxypropyloxypropyl polydimethylsiloxane (MW ~1000), commercially available from Geleste, Inc, of Tullytown Pa. under the name Polydimethylsiloxane acryloxy terminated DMS-U22.
Macromer Prepared as described in US20030052424, Example 1
TMPTMA trimethylolpropane trimethacrylate
BAGE boric acid ester of glycerin
MAA methacrylic acid
Irgacure 1700 A 75/25% (wt) blend of 2-hydroxy-2-methyl-1-phenyl-propan-1-one and bis(2,6-dimethoxybenzoyl)-2,4,4-trimethylpentyl phosphine oxide
Zeonor Cyclo olefin thermoplastic polymer from Nippon Zeon Co., Ltd.
Preparation 1

A three neck, 500 mL round bottom flask equipped with a magnetic stirrer, reflux condensor w/drying tube, and a thermocouple was charged with 5.0 g (0.054 mole) dry lithium methacrylate. Methacrylic acid (50.0 g, 0.584 mole) and 1.0 g p-methoxyphenol were added to the system, which was stirred while adding 200 g (about 0.20 mole) monoglycidoxypropyl polydimethylsiloxane (1000 $M_N$) to the flask. The reaction mixture was heated to 90° C. The mixture was heated for 15 hours at the given temperature, allowed to cool to ambient conditions, and diluted with 250 mL of ethyl acetate.

The organics were washed two times with 250 mL of 0.5N aqueous sodium hydroxide. Once all the methacrylic acid present in the mixture was neutralized, separation of the two layers dramatically slowed down. The third and fourth washes were performed using an aqueous solution of 0.5N sodium hydroxide and 5% wt/volume sodium chloride in order to speed up the separation process.

The organics were dried over 30 g of anhydrous sodium sulfate, and filtered through a fritted glass funnel containing 75 g of flash grade silica gel to remove any remaining salts in the system. The filtrate was freed of volatile material in a rotary evaporator at 55° C. under a pressure of approximately 10 mbar.

The product, mono-(3-methacryloxy-2-hydroxypropyloxy)propyl terminated, mono-butyl terminated polydimethylsiloxane (MW 1100), was isolated as a colorless, clear liquid, 173.0 g, 79.7%.

Preparation 2

A solution of 20 ml N-vinyl-N-methylactamide, 20 g t-butanol and 15.5 mg azobisisobutyronitrile was degassed under vacuum, then heated to 75° C. for 16 hours to produce a viscous clear solution. 150 ml methanol was added and the mixture was transferred to a flask for rotary evaporation. After solvent was removed the polymer was dissolved in 100 ml methylene chloride and the polymer was precipitated by addition of about 1 L hexane. The precipitate was squeezed to remove excess solvent, and dried under vacuum overnight to produce 12.3 g PVMA as a white solid.

PVMA Preparation

A solution of 102.5 g N-methyl-N-vinylacetamide, 102.5 g t-butanol and 46.5 mg 2,2'-azobisisobutylnitrile was deoxygenated by bubbling $N_2$ gas through it for one hour. The solution was heated to 75° C. with stirring under $N_2$ for 16 hours. Solvent was evaporated from the resulting viscous solution under vacuum. The resulting crude polymer was dissolved in 250 ml $CH_2Cl_2$. 2.5 L hexane was added to precipitate polymer. The resulting solid polymer mass was broken into pieces and dried under vacuum at 80° C. Molecular weight analysis by GPC showed $M_N$ and $M_W$ of 366,000 and 556,000 respectively.

Example 1

Contact lenses were made from the formulation listed in Table 1, below.

TABLE 1

| Component | Amount (g) | Wt %[a] |
|---|---|---|
| mPDMS | 4.771 | 30.98 |
| SIGMA | 4.307 | 27.97 |
| DMA | 3.692 | 23.98 |
| HEMA | 0.929 | 6.03 |
| TEGDMA | 0.232 | 1.51 |
| Norbloc | 0.311 | 2.02 |
| PVMA | 1.082 | 7.03 |
| CGI1850 | 0.074 | 0.48 |
| D3O(diluent) | 4.602 | 23.01[b] |

[a]Excluding diluent.
[b]With respect to final reactive monomer mix.

The monomer mixture was degassed by placing it under vacuum for 30 minutes, and then used to make lenses in a nitrogen box (Zeonor front curves and polypropylene back curves, 50° C.) under four parallel visible light Philips TL03 fluorescent lamps (30 minute cure). The lenses were demolded manually and released in 70:30 IPA:DI water. The lenses were then soaked in the following solutions for the times indicated: 100% IPA (1 hour), 70:30 (vol) IPA:DI water (1 hour), 10:90 IPA:DI water (1 hour), DI water (30 minutes).

The lenses were stored in fresh DI water. The lenses felt highly lubricious upon touching. For haze/DCA analysis (Table 2) lenses were autoclaved once (122.5° C., 30 minutes) in 5.0 mL packing solution (borate buffered saline solution), while for mechanical properties and water content (Table 2), the lenses were autoclaved once in packing solution containing 50 ppm methylcellulose.

TABLE 2

| Property | Value |
| --- | --- |
| Modulus (n = 5) | 78 +/− 6 psi |
| Elongation (n = 5) | 175 +/− 41% |
| Water content (n = 9) | 39 +/− 0.3% |
| Haze (n = 5) | 28 +/− 2% |
| Advancing contact angle (n = 4) | 42 +/− 18° |

The properties in Table 2 demonstrate that PVMA can be incorporated into a hydrogel composition to form an article having desirable mechanical properties.

Example 2

Contact lenses were made from the formulation listed in Table 3, below.

TABLE 3

| Component | Amount used (g) | Percent[a] |
| --- | --- | --- |
| mPDMS-OH | 0.87 | 52.57 |
| acPDMS | 0.0427 | 2.58 |
| DMA | 0.394 | 23.81 |
| HEMA | 0.228 | 13.78 |
| PVMA | 0.116 | 7.01 |
| CGI 819 | 0.0041 | 0.25 |
| Diluent: t-amyl alcohol | 1.351 | 44.95[b] |

[a]Excluding diluent.
[b]With respect to final reactive monomer mix.

The monomer mixture was degassed under vacuum for 10 minutes, and then used to make lenses in a nitrogen box (Zeonor front curves and polypropylene back curves, 50° C.) under four parallel Philips TL03 lamps (20 minute cure). The lenses were demolded manually and immersed in 30:70 IPA:DI water for 10 minutes. The lenses were released in ~1 L of boiling DI water, then transferred into packing solution. The lenses felt highly lubricious. For DCA analysis lenses were autoclaved once (122.5° C., 30 minutes) in packing solution (5.0 mL). The advancing contact angle was determined to be 45±5°.

Comparative Example 3 and Example 4

Contact lenses were made from the formulations listed in Table 4, below.

TABLE 4

| Component | Comp. Ex. 3 (wt %)* | Ex. 4 (wt %)* |
| --- | --- | --- |
| mPDMS-OH | 50.00 | 49.97 |
| Macromer ** | 10.01 | 9.99 |
| AcPDMS | 2.02 | 2.00 |
| DMA | 20.00 | 20.05 |
| HEMA | 8.52 | 8.53 |
| Norbloc | 2.20 | 2.20 |
| PVP 360,000 | 7.00 | — |
| PVMA | — | 7.02 |
| CGI 819 | 0.25 | 0.25 |
| Diluent: t-amyl alcohol | 45[b] | 45[b] |

[a]Excluding diluent.
[b]With respect to final reactive monomer mix.
Macromer preparation described in U.S. 2003/0052424

The monomer mixes were filtered through 3 μm pore filter before use. The monomer mixtures were degassed under vacuum for 15 minutes, and then used to make lenses in a nitrogen box (Zeonor front curves and polypropylene back curves, 50° C.) under four parallel Philips TL03 lamps (30 minute cure). The lenses were demolded manually, released in ~1 L of boiling DI water, and then transferred into packing solution. Table 5 summarizes the properties of the lenses.

TABLE 5

| Property | Comp. Ex 3 | Ex 4 |
| --- | --- | --- |
| Dk | 171.5 | —[a] |
| Modulus (n = 5) | 88 +/− 6 psi | 92 +/− 10 psi |
| Elongation (n = 5) | 216 +/− 71% | 232 +/− 30% |
| Water content (n = 9) | 35.6 +/− 0.5% | 38.6 +/− 0.3% |
| Haze (n = 5) | 12.9 +/− 3.9% | 14.3 +/− 3.8% |
| Advancing contact angle (n = 5) | 59 +/− 7° | 50 +/− 9° |

[a]Did not measure.

A study was conducted to assess the relative lubricity of lenses containing PVP (Example 3) against lenses containing PVMA (Example 4). Seven subjects were masked from the identity of the lenses, and provided two vials containing a single lens. One vial contained a lens from Example 3 (which contained PVP), and the other contained a lens from Example 4 (containing PVMA). Each subject was asked to subjectively rate which lens felt more lubricious. All seven subjects picked the lens of Example 4.

The dynamic coefficients of friction (COF) of the lenses of Examples 3 and 4 were measured. The measurements were done using a polished stainless steel as the reference surface and the test speed was at 15 cm/s. All measurements were done in the lens own packing solution from the package."
The data in Table 6 show that incorporation of 7% PVMA in silicone hydrogel lenses provided more lubricious lenses than incorporation of 7% PVP.

TABLE 6

| Ex. # | IWA | COF |
| --- | --- | --- |
| C3 | PVP | 0.07 (0.01) |
| 4 | PVMA | 0.038 (0.004) |

Table 6 shows that the lenses with PVMA have a COF of about half that of PVP.

Examples 5 and 6

1-Day Acuvue® brand contact lenses (commercially available from Johnson & Johnson Vision Care, Inc.) were washed in borate buffered saline (5 rinses over 24 hours) to remove any residual TWEEN-80. The washed lenses were packaged in with either 250 or 500 ppm PVMA in borate buffered saline solution, as shown in Table 7, below and sterilized (121° C., 30 minutes). The contact angle was determined and is reported in Table 7.

TABLE 7

| Ex. # | [PVMA] (ppm) | contact angle |
|---|---|---|
| 5 | 250 | 74 (5) |
| 6 | 500[1] | 56 (9) |
| Control | — | 78 (5) |

The diameter of the lenses was measured once a week over a period of five weeks. The results are shown in Table 8.

TABLE 8

PVMA lens diameters

| Ex# | PVMA (ppm) | T (° C.) | Week 1 | Week 2 | Week 3 | Week 4 | Week 5 |
|---|---|---|---|---|---|---|---|
| C | 0 | 23° C. | 14.17 | 14.14 | 14.18 | 14.17 | 14.18 |
| C | 0 | 55° C. | 14.15 | 14.12 | 14.20 | 14.15 | 14.16 |
| 5 | 250 | 23° C. | 14.20 | 14.15 | 14.20 | 14.17 | 14.19 |
| 5 | 250 | 55° C. | 14.20 | 14.16 | 14.24 | 14.19 | 14.19 |
| 6 | 500 | 23° C. | 14.19 | 14.19 | 14.22 | 14.20 | 14.21 |
| 6 | 500 | 55° C. | 14.23 | 14.19 | 14.28 | 14.20 | 14.20 |

C = control

The lens diameters for lenses at both PVMA concentrations remained stable.

Example 7

1-Day Acuvue® brand contact lenses (commercially available from Johnson & Johnson Vision Care, Inc.) were placed into borate-buffered saline containing 500 ppm PVMA, as described in Example 6. The lenses were sterilized multiple times, 30 minutes at 121° C. per cycle. The lens surfaces had a lubricious feel after each sterilization cycle.

Example 8

1-Day Acuvue® brand contact lenses (commercially available from Johnson & Johnson Vision Care, Inc.) were placed into plastic blister packages containing 950 μl each of a solution of 1000 ppm PVMA in borate-buffered saline. The packages were sealed, heat sterilized (121° C. for 30 minutes) and clinically evaluated in a double-masked study. Nine patients wore the lenses in both eyes for 3-4 days with overnight removal and daily replacement, and then wore untreated 1-Day Acuvue® brand contact lenses for 3-4 days with overnight removal and daily replacement as a control. Patients were asked to rate the lens using a questionnaire. The results are shown in Table 10.

TABLE 10

|  | Preferred Ex. 11 | Preferred Control | Liked both | Liked neither |
|---|---|---|---|---|
| Overall preference | 67% | 11% | 22% | 0% |
| Comfort preference | 67% | 0% | 33% | 0% |
| End of day comfort | 78% | 11% | 11% | 0% |
| Dryness preference | 78% | 11% | 11% | 0% |
| Wear time | 78% | 11% | 11% | 0% |

Example 9 and 10

The reactions mixtures listed in Table 11 were cured in a nitrogen atmosphere (Zeonor front curves and back curves, ~75 mg per cavity, ~50° C.) under Philips TLK 40 W/03 lamps (4 minute cure). Lenses were released from the molds in DI water containing about 800 ppm Tween 80 at ~70° C. for 150-210 minutes, and rinsed twice in DI water at about 45° C. for 15-60 minutes and about 180 minutes, respectively. The lenses were packaged in 1•DAY ACUVUE® Brand contact lens bowl and foil in borate buffered saline and sterilized (121° C., 30 minutes).

TABLE 11

| Components | Ex. 9 (wt %) | Ex. 10 (wt %) |
|---|---|---|
| HEMA | 92.89 | 92.89 |
| Norbloc 7966 | 0.95 | 0.95 |
| Irgacure 1700 | 1.34 | 1.34 |
| EGDMA | 0.77 | 0.77 |
| TMPTMA | 0.09 | 0.09 |
| MAA | 1.94 | 1.94 |
| Blue HEMA | 0.02 | 0.02 |
| PVP 360K | 2.00 | — |
| PVMA | — | 2.00 |
| Diluent | 52:48 | 52:48 |
| BAGE Diluent | 48% | 48% |

The feel of the lenses of Examples 9-10 were subjectively compared as follows. The control was 1-Day Acuvue® brand contact lenses. Ten contact lens wearers were asked to rate their preference among different lenses (including the 1-DAY ACUVUE brand contact lens control) based on touch alone. A rating of "1" indicated that the lens was preferred, and based upon feel alone, the tester would prefer that lens. A rating of "4" was not preferred. The contact lens wearers rating the lenses were permitted to rate more than one lens a 1. The average preference scores are listed in Table 12 below. Standard deviations are shown in parenthesis.

TABLE 12

| Ex # | Wetting agent | Pref. score |
|---|---|---|
| 9 | PVP | 2.6 (1) |
| 10 | PVMA | 1.6 (0.9) |
| control | — | 3.3 (1) |

Thus, lenses formed from conventional hydrogel formulations which contain PVMA display tactile properties such as lubricity which are better than lenses which do not contain any wetting agent, and are at least as good as lenses containing PVP.

The invention claimed is:

1. A biomedical device comprising a lens polymer having entangled therein at least one acyclic polyamide having a weight average molecular weight of at least about 100,000 and comprising repeating units of Formula I

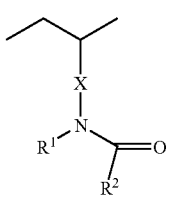

Wherein X is a direct bond,

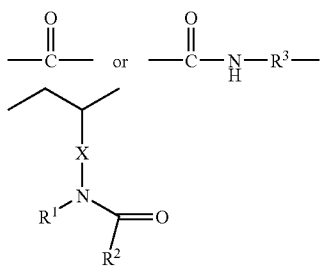

wherein R³ is a C1 to C3 alkylene group;
R¹ is selected from H, straight or branched, substituted or unsubstituted C1 to C4 alkyl groups,
R² is selected from H, straight or branched, substituted or unsubstituted C1 to C4 alkyl groups, amino groups having up to two carbons, amide groups having up to four carbon atoms and alkoxy groups having up to two carbons and wherein the number of carbon atoms in R¹ and R² taken together is 8 or less.

2. The device of claim 1 wherein the number of carbon atoms in R¹ and R² taken together is 6 or less.

3. The device of claim 1 wherein R¹ and R² are independently selected from H, substituted or unsubstituted C1 to C2 alkyl groups.

4. The device of claim 1 wherein R¹ and R² are independently selected from H, unsubstituted C1 to C2 alkyl groups.

5. The device of claim 1 wherein X is a direct bond.

6. The device of claim 5 wherein R2 is selected from straight or branched unsubstituted C1 to C4 alkyl groups.

7. The device of claim 1 comprising a mixture of acyclic polyamides.

8. The device of claim 5 wherein R¹ and R² are independently selected from H, substituted or unsubstituted C1 to C2 alkyl groups.

9. The device of claim 1 wherein said acyclic polyamide has a weight average molecular weight of at least about 300,000.

10. The device of claim 1 wherein said acyclic polyamide has a weight average molecular weight of at least about 1,000,000.

11. The device of claim 1 wherein said acyclic polyamide is a copolymer comprising at least about 50 mole % of the repeating unit of Formula I.

12. The device of claim 1 wherein said acyclic polyamide is a copolymer comprising at least about 80 mole % of the repeating unit of Formula I.

13. The device of claim 12 wherein said copolymer further comprises repeating units selected from the group consisting of N-vinyl amides, acrylamides, hydroxyalkyl(meth)acrylates, alkyl(meth)acrylates and siloxane substituted acrylates or methacrylates.

14. The device of claim 12 wherein said copolymer further comprises repeating units selected from N-vinylpyrrolidone, N,N-dimethylacrylamide, 2-hydroxyethylmethacrylate, vinyl acetate, acrylonitrile, hydroxypropyl methacrylate, 2-hydroxyethyl acrylate, methyl methacrylate and butyl methacrylate, methacryloxypropyl tristrimethylsiloxysilane and mixtures thereof.

15. The device of claim 12 wherein said copolymer further comprises repeating units selected from N-vinylpyrrolidone, N,N-dimethylacrylamide, 2-hydroxyethylmethacrylate and mixtures thereof.

16. The device of claim 1 wherein said repeating unit comprises N-vinyl-N-methylacetamide.

17. The device of claim 1 wherein said acyclic polyamide is poly(N-vinyl-N-methylacetamide).

18. The device of claim 1 wherein said device is formed from a hydrogel comprising at least one hydrophilic component.

19. The device of claim 1, wherein said device is an ophthalmic device.

20. The device of claim 1, wherein said device is a contact lens.

21. The device of claim 1 wherein said acyclic polyamide is present in an amount between about 1 to about 15 weight percent, based upon the total of all reactive components.

22. The device of claim 1 wherein said acyclic polyamide is present in an amount between about 3 to about 15 percent, based upon the total of all reactive components.

23. The device of claim 1 wherein said acyclic polyamide is present in an amount between about 5 to about 12 weight percent, based upon the total of all reactive components.

24. The device of claim 1 wherein said device is formed by polymerizing a reaction mixture comprising said acyclic polyamide.

* * * * *

UNITED STATES PATENT AND TRADEMARK OFFICE
CERTIFICATE OF CORRECTION

PATENT NO. : 8,022,158 B2  
APPLICATION NO. : 12/710980  
DATED : September 20, 2011  
INVENTOR(S) : Osman Rathore It is certified that error appears in the above-identified patent and that said Letters Patent is hereby corrected as shown below:

In Column 23, beginning at line 6, please delete the second figure listed as:

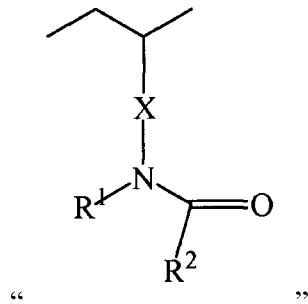

" "

Signed and Sealed this  
Fifteenth Day of November, 2011

David J. Kappos  
*Director of the United States Patent and Trademark Office*